United States Patent
Giri

(10) Patent No.: US 9,922,512 B2
(45) Date of Patent: Mar. 20, 2018

(54) SECURITY PANEL WITH VIRTUAL SENSORS

(71) Applicant: UTC Fire and Security Americas Corporation, Inc., Bradenton, FL (US)

(72) Inventor: Prashanth Giri, Hyderabad (IN)

(73) Assignee: UTC FIRE AND SECURITY AMERICAS CORPORATION, INC., Bradenton, FL (US)

( * ) Notice: Subject to any disclaimer, the term of this patent is extended or adjusted under 35 U.S.C. 154(b) by 14 days.

(21) Appl. No.: 15/030,126

(22) PCT Filed: Dec. 4, 2014

(86) PCT No.: PCT/US2014/060411
§ 371 (c)(1),
(2) Date: Apr. 18, 2016

(87) PCT Pub. No.: WO2015/069420
PCT Pub. Date: May 14, 2015

(65) Prior Publication Data
US 2016/0267756 A1    Sep. 15, 2016

Related U.S. Application Data

(60) Provisional application No. 61/892,111, filed on Oct. 17, 2013.

(51) Int. Cl.
*G08B 13/12* (2006.01)
*G05B 15/02* (2006.01)
(Continued)

(52) U.S. Cl.
CPC .......... *G08B 13/122* (2013.01); *G05B 15/02* (2013.01); *G05B 23/0221* (2013.01);
(Continued)

(58) Field of Classification Search
None
See application file for complete search history.

(56) References Cited

U.S. PATENT DOCUMENTS

| 5,386,373 A | 1/1995 | Keeler et al. |
| 6,904,391 B2 | 6/2005 | Merkin et al. |
| (Continued) | | |

FOREIGN PATENT DOCUMENTS

| CN | 102498471 | 6/2012 |
| TW | 2012341266 | 8/2012 |
| (Continued) | | |

OTHER PUBLICATIONS

International Application No. PCT/US2014/060411 International Search Report and Written Opinion dated Feb. 19, 2015, 10 pages.

*Primary Examiner* — Brian Zimmerman
*Assistant Examiner* — Sara Samson
(74) *Attorney, Agent, or Firm* — Cantor Colburn LLP

(57) ABSTRACT

Embodiments are directed to a security panel configured to interface with virtual sensors. The security panel includes a sensor subsystem configured to receive sensor input from a plurality of physical sensors. A virtual sensor subsystem is configured to receive a virtual sensor input from an enrolled virtual sensor source as a virtual sensor and provide the virtual sensor input to the sensor subsystem. A monitoring subsystem is configured to provide an alert based on detection of an alert condition associated with at least one of the physical sensors and to provide the alert based on detection of a virtual alert condition associated with the virtual sensor.

17 Claims, 5 Drawing Sheets

(51) Int. Cl.
*G05B 23/02* (2006.01)
*G08B 13/24* (2006.01)
*G08B 25/14* (2006.01)
*H04L 12/28* (2006.01)
*H04L 29/08* (2006.01)
*H04W 4/02* (2018.01)

(52) U.S. Cl.
CPC ......... *G08B 13/2491* (2013.01); *G08B 25/14* (2013.01); *H04L 12/2825* (2013.01); *H04L 67/12* (2013.01); *H04W 4/021* (2013.01); *G05B 2219/2642* (2013.01)

(56) References Cited

U.S. PATENT DOCUMENTS

| | | | |
|---|---|---|---|
| 7,020,701 | B1 | 3/2006 | Gelvin |
| 7,149,660 | B2 | 12/2006 | Kuehn et al. |
| 7,542,879 | B2 | 6/2009 | Grichnik et al. |
| 7,917,333 | B2 | 3/2011 | Grichnik et al. |
| 8,036,764 | B2 | 10/2011 | Grichnik et al. |
| 8,249,731 | B2 | 8/2012 | Tran et al. |
| 2007/0239399 | A1 | 10/2007 | Sheynblat et al. |
| 2009/0055126 | A1 | 2/2009 | Yanovich et al. |
| 2009/0320143 | A1 | 12/2009 | Gear et al. |
| 2010/0302042 | A1* | 12/2010 | Barnett ............ G08B 21/24 340/573.1 |
| 2012/0323343 | A1 | 12/2012 | Grichnik et al. |

FOREIGN PATENT DOCUMENTS

| | | | |
|---|---|---|---|
| WO | WO2005015829 | 2/2005 | |
| WO | 2006137022 | 12/2006 | |
| WO | WO 2006137022 A1 * | 12/2006 | ......... G05B 23/0221 |
| WO | WO2007058695 | 5/2007 | |

* cited by examiner

FIG. 5

SECURITY PANEL WITH VIRTUAL SENSORS

BACKGROUND

The subject matter disclosed herein relates to security systems, and in particular, to a security panel with virtual sensors.

An intrusion-fire alarm security system typically includes a security panel that interfaces to a variety of wired and wireless sensors that detect input conditions in its vicinity and send these signals to the security panel for processing. These sensors are usually located within the premises of the panel. For example, in a household installation, the sensors may include a door sensor, smoke sensors, motion detectors, etc. The sensors provide situational awareness to the security panel in and around the property which is secured. The reach of these sensors is typically limited, as they provide localized information.

When third parties desire to develop additional sensors for the security panel, it can be challenging to interface the sensors to the security panel without making modifications to the security panel hardware. Third-party sensor manufacturers may face additional difficulty in developing uniform sensor interfaces, as different security panel manufactures can have proprietary interfaces that are not universally compatible. Accordingly, integration of new sensor designs or modules may be limited and costly.

BRIEF SUMMARY

An embodiment is directed to a security panel that includes a sensor subsystem configured to receive sensor input from a plurality of physical sensors. A virtual sensor subsystem is configured to receive a virtual sensor input from an enrolled virtual sensor source as a virtual sensor and provide the virtual sensor input to the sensor subsystem. A monitoring subsystem is configured to provide an alert based on detection of an alert condition associated with at least one of the physical sensors and to provide the alert based on detection of a virtual alert condition associated with the virtual sensor.

An embodiment is directed to a security system that includes a plurality of virtual sensors configured to provide virtual sensor input from a plurality of enrolled virtual sensor sources and a plurality of physical sensors configured to provide sensor input. The security system also includes a security panel that includes a sensor subsystem configured to receive sensor input from the plurality of physical sensors. A virtual sensor subsystem is configured to receive a virtual sensor input and provide the virtual sensor input to the sensor subsystem. A monitoring subsystem is configured to provide an alert based on detection of an alert condition associated with at least one of the physical sensors and to provide the alert based on detection of a virtual alert condition associated with at least one of the virtual sensors.

An embodiment is directed to a method for virtual sensor management on a security panel. A request is received at the security panel to add a virtual sensor. A virtual sensor source is enrolled through a virtual sensor subsystem of the security panel. The enrolled virtual sensor source is configured to provide a virtual sensor input of the virtual sensor. The virtual sensor is configured to establish a virtual alert condition. Monitoring of the virtual sensor is initiated in addition to monitoring of a plurality of physical sensors through a sensor subsystem of the security panel that establishes a security perimeter. An alert is output based on detection of the virtual alert condition associated with the virtual sensor.

Additional embodiments are described below.

BRIEF DESCRIPTION OF THE DRAWINGS

The present disclosure is illustrated by way of example and not limited in the accompanying figures in which like reference numerals indicate similar elements.

FIG. 5 illustrates an example of a remotely triggered alert via a virtual sensor in accordance with one or more embodiments.

DETAILED DESCRIPTION

Figure 1:
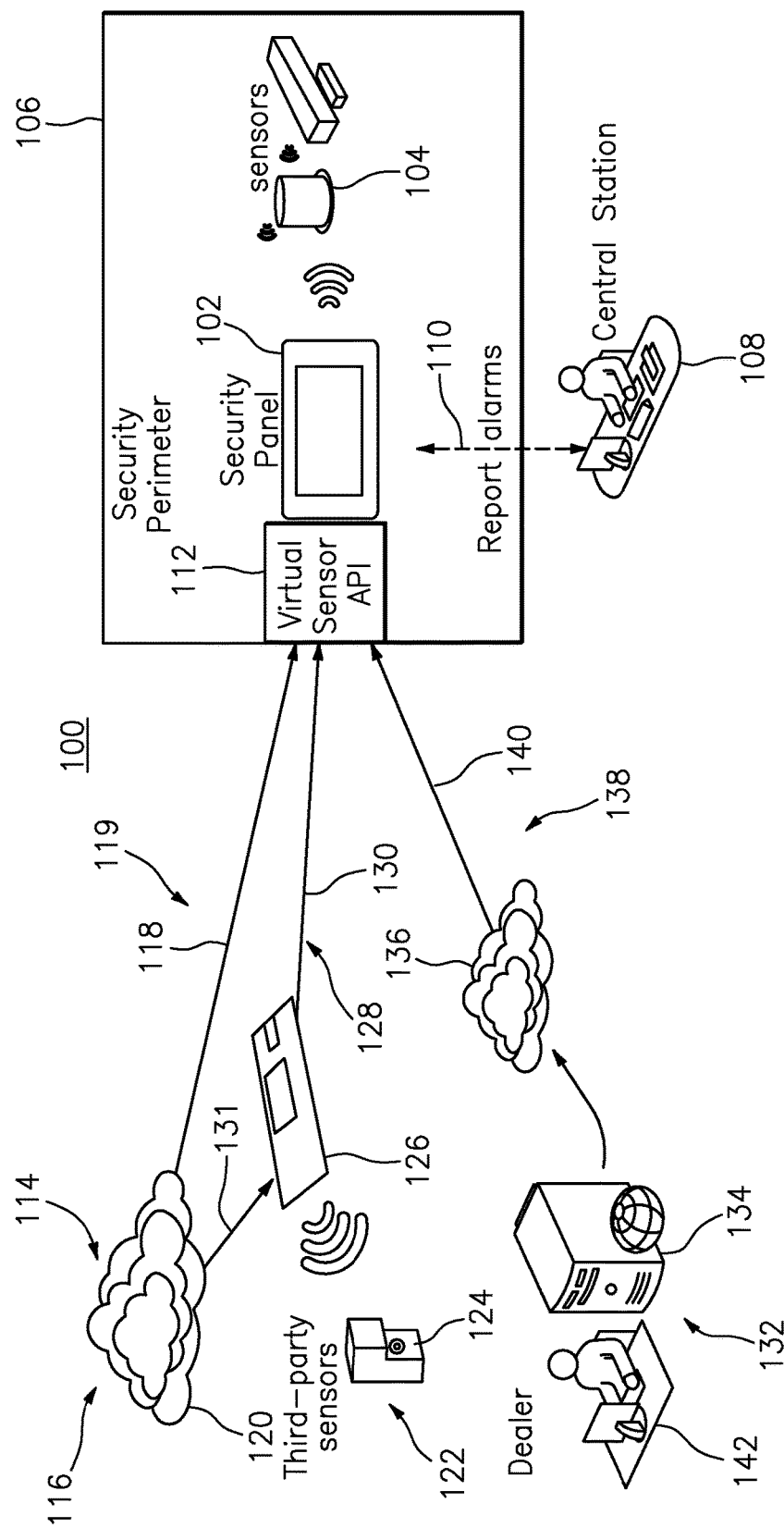
FIG. 1 is a schematic block diagram illustrating a system in accordance with one or more embodiments.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect in this respect, a coupling between entities may refer to either a direct or an indirect connection.

Exemplary embodiments of apparatuses, systems, and methods are described for a security panel with virtual sensors. In some embodiments, the virtual sensors may be physical sensors that are not directly compatible with an existing physical sensor interface of the security panel. Virtual sensors may also be driven by remote data sources, such as a weather alert system or a dealer system.

Referring to FIG. 1, an exemplary security system 100 is shown. The security system 100 is shown as including a security panel 102. The security panel 102 interfaces with a plurality of physical sensors 104 to establish a security perimeter 106. The physical sensors 104 may be configured to detect whether an intrusion event occurs with respect to the security perimeter 106. For example, the physical sensors 104 may be placed on a wall, a door, a window, or at any other location to establish the security perimeter 106. The physical sensors 104 may include door, window, motion, smoke, carbon monoxide, and other sensors known in the art. The physical sensors 104 can be coupled by wired or wireless links (e.g., 319 MHz) to the security panel 102. A central station 108 may monitor the security panel 102 remotely and take further actions in response to reported alarms 110.

In exemplary embodiments, the security panel 102 includes a virtual sensor application programming interface (API) 112 that provides a common interface and acts as an adapter for a variety of virtual sensor sources. The API 112 enables assignment of a virtual sensor source as a virtual sensor, where the virtual sensor source can be a physical sensor absent a compatible direct interface to the security panel 102 or a data source provided from a remote location. Enrollment of a virtual sensor enables the security panel 102 to recognize and interact with the virtual sensor via the API 112 as if the virtual sensor was one of the physical sensors 104. Enrollment may include registering an identifier for the virtual sensor that is recognized by the security panel 102 such that the virtual sensor can be configured and monitored. Once a virtual sensor source is enrolled, its corresponding virtual sensor can be recognized as providing a virtual sensor input into the security panel 102. In the example of FIG. 1, an enrolled virtual sensor source 114 is a remote data source 116 external to the security perimeter 106 and configured to provide a virtual sensor alert as virtual sensor input 118 to a virtual sensor subsystem of the security panel 102 through the virtual sensor API 112 as a virtual sensor 119. The remote data source 116 can be, for example, a weather alert system that delivers critical weather warnings through a network 120, such as the Internet, as the virtual sensor input 118 to be reported as an alarm immediately on the security panel 102. A geographic location of the security perimeter 106 or security panel 102 can be used to target weather alerts from die remote data source 116. The network 120 may also support enrolling additional virtual sensor sources external to the security perimeter 106, e.g., Internet-based data sources.

Another enrolled virtual sensor source 122 may be a third-party source for a physical sensor 124 to add in or extend the security perimeter 106, where the physical sensor 124 is not directly compatible with a sensor subsystem of the security panel 102 to which the physical sensors 104 interface. A third-party receive module 126 may interface with the physical sensor 124 and present it as a virtual sensor 128 providing virtual sensor input 130 to the virtual sensor API 112. The third-party receive module 126 may also support additional sources 131 through the network 120 and/or other sensors (not depicted).

Another enrolled virtual sensor source 132 may be a dealer system 134 that can communicate through a network 136 as a virtual sensor 138 providing virtual sensor input 140 to the virtual sensor API 112. A dealer 142 can set a state of the virtual sensor 138 remotely as meeting a virtual alert condition to trigger a virtual alert on the security panel 102. The dealer 142 may also be able to set virtual alerts for other virtual sensors, such as virtual sensor 119.

Figure 2:
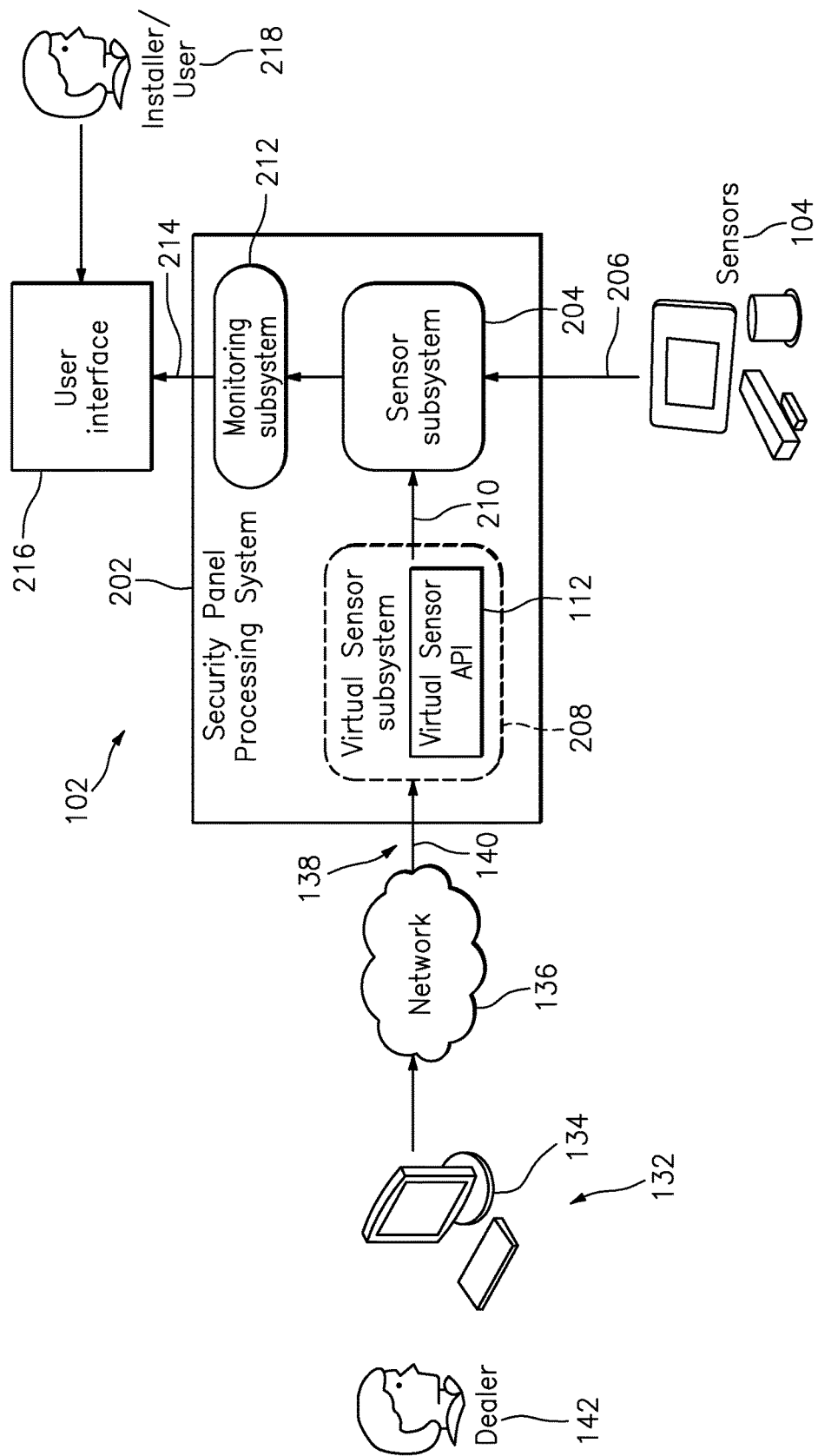
FIG. 2 is a schematic block diagram illustrating a portion of the system of FIG. 1 in accordance with one or more embodiments.

FIG. 2 is a schematic, block diagram illustrating a portion of the security system 100 of FIG. 1 in accordance with an embodiment. A security panel processing system 202 of the security panel 102 includes a sensor subsystem 204 configured to receive sensor input 206 from the physical sensors 104. The security panel processing system 202 also includes a virtual sensor subsystem 208 configured to receive virtual sensor input from enrolled virtual sensor sources as virtual sensors, such as virtual sensor input 140 from the enrolled virtual sensor source 132 as virtual sensor 138 through network 136. In the example of FIG. 2, the dealer system 134 is the enrolled virtual sensor source 132, where the dealer 142 can set a state of the virtual sensor 138. The virtual sensor API 112 of the virtual sensor subsystem 208 receives the virtual sensor input 140 and can perform a protocol or formatting adjustment to provide virtual sensor input 210 to the sensor subsystem 204 in a compatible protocol/format.

A monitoring subsystem 212 of the security panel processing system 202 is coupled to the sensor subsystem 204. The monitoring subsystem 212 is configured to provide an alert 214 based on detection of an alert condition associated with at least one of the physical sensors 104 and to provide the alert 214 based on detection of a virtual alert condition associated with the virtual sensor 138. The alert 214 can be provided to a user interface 216 to generate a visual and/or audio alarm to an installer or user 218. The alert 214 may also or alternatively be provided to the central station 108 of FIG. 1.

In exemplary embodiments, the virtual sensor subsystem 208 provides general sensor management services like adding, removing and controlling the state of sensors etc. The dealer 142 can perform sensor activities for the virtual sensors, such as getting a list of sensors, adding, a sensor, removing a sensor, or setting a sensor's state. Once a virtual sensor, such as virtual sensor 138 is added and configured to the security panel 102, the dealer 142 can set the state of the virtual sensor remotely, thus triggering an alarm/alert at the security panel 102.

Figure 3:
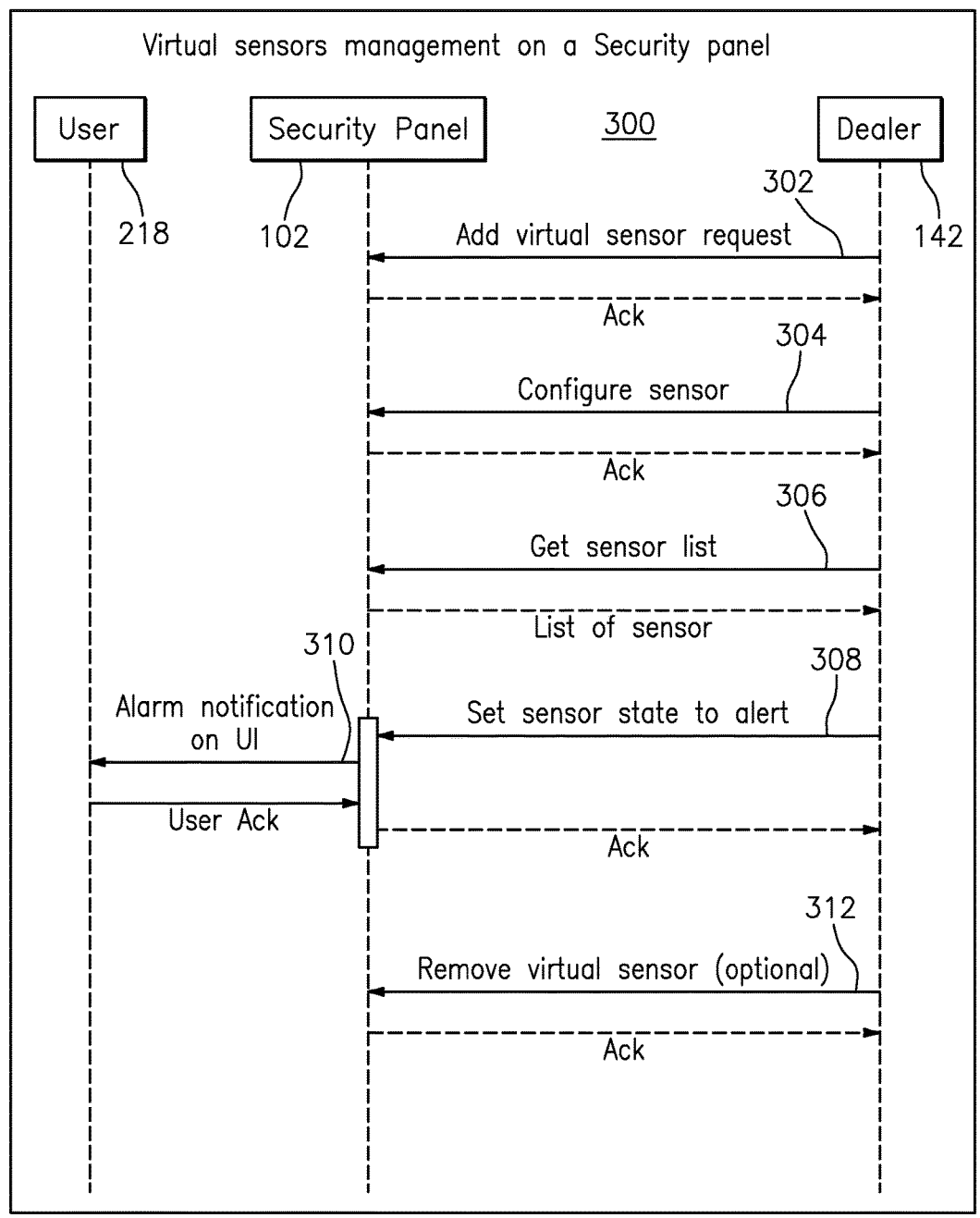
FIG. 3 illustrates a sequence diagram in accordance with one or more embodiments.

FIG. 3 illustrates a sequence diagram 300 in accordance with one or more embodiments. At action 302, an authenticated authorized party, such as the dealer 142, requests addition of a virtual sensor corresponding to a condition to be monitored/alerted, and the security panel 102 receives the request to add the virtual sensor. The security panel 102 enrolls a virtual sensor source through the virtual sensor subsystem 208 of FIG. 2, where the enrolled virtual sensor source is configured to provide a virtual sensor input of the virtual sensor. Upon adding the virtual sensor, the security panel 102 can respond with an acknowledgement. At action 304, the dealer 142 can initiate configuration of the virtual sensor to establish or modify a virtual alert condition, as well as other configurable settings.

The security panel 102 initiates monitoring of the virtual sensor in addition to monitoring of the physical sensors 104 of FIGS. 1 and 2 through the sensor subsystem 204 of FIG. 2 that establishes the security perimeter 106 of FIG. 1. At action 306, the dealer 142, at any time, can get a list at sensors configured for the security panel 102, which may include both virtual and physical sensors. At action 308, the dealer 142 can set the state of the virtual sensor to an active state, indicating, a virtual alert condition. At action 310, the security panel 102 detects the state change of the virtual sensor as meeting, the virtual alert condition based on a remotely issued command from the dealer 142 at action 308, and outputs an alert to the user interface 216 of FIG. 2. The alert can be an alarm or a warning message in audio and/or visual forms. The user 218 can acknowledge the alert through the user interface 216 of FIG. 2, which is communicated back to the dealer 142. The adding of virtual sensors, configuring of virtual sensors, setting virtual sensor states, and triggering of alerts can target individual instances of the security panel 102 and/or groups of security panels 102.

As a further action 312, the dealer 142 can remove a virtual sensor from one or more security panels 102 remotely. When operating on a group or set of security panels 102, each of the security panels 102 can remove a virtual sensor based on receiving a removal request at the security panel 102 identifying the virtual sensor, which may be initiated remotely without the dealer 142 being physically present at each security panel 102.

Figure 4:
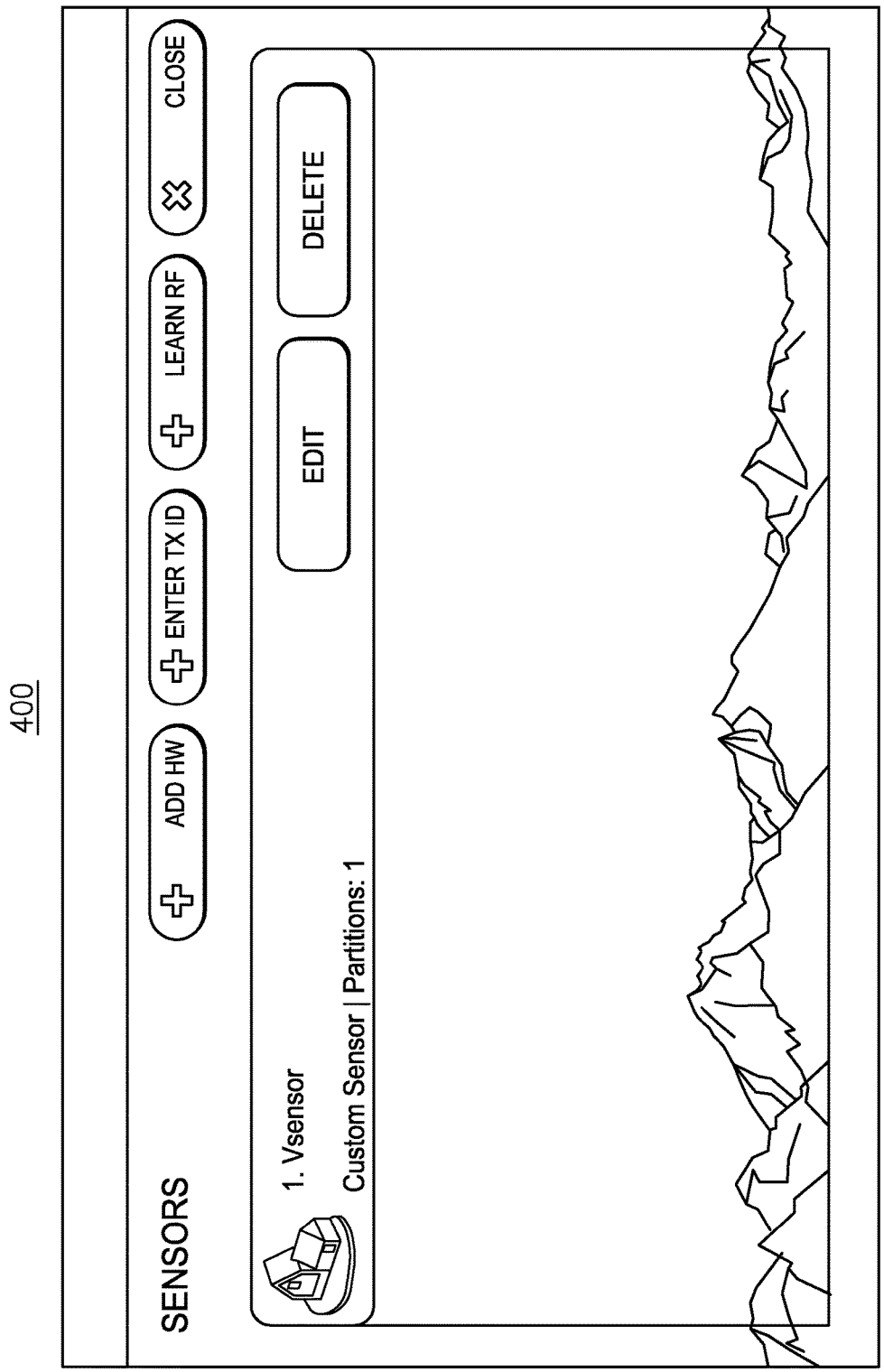
FIG. 4 illustrates an example of a user interface for adding a virtual sensor in accordance with one or more embodiments.

FIG. 4 illustrates an example of a user interface 400 for adding a virtual sensor in accordance with one or more embodiments. The example user interface 400 is an example of an interactive display that may be rendered on the user interface 216 of FIG. 2. Accordingly, an installer or user 218 can add hardware, enter an identifier, request learning of an associated radio frequency for a sensor, and edit setting for virtual sensors, similar to the physical sensors 104 of FIGS. 1 and 2. The virtual sensor API 112 of FIGS. 1 and 2 provides a transparent interface such that installation of a virtual sensor is substantially similar to installation of the physical sensors 104 of FIGS. 1 and 2 from a user and/or installer perspective.

Figure 5:
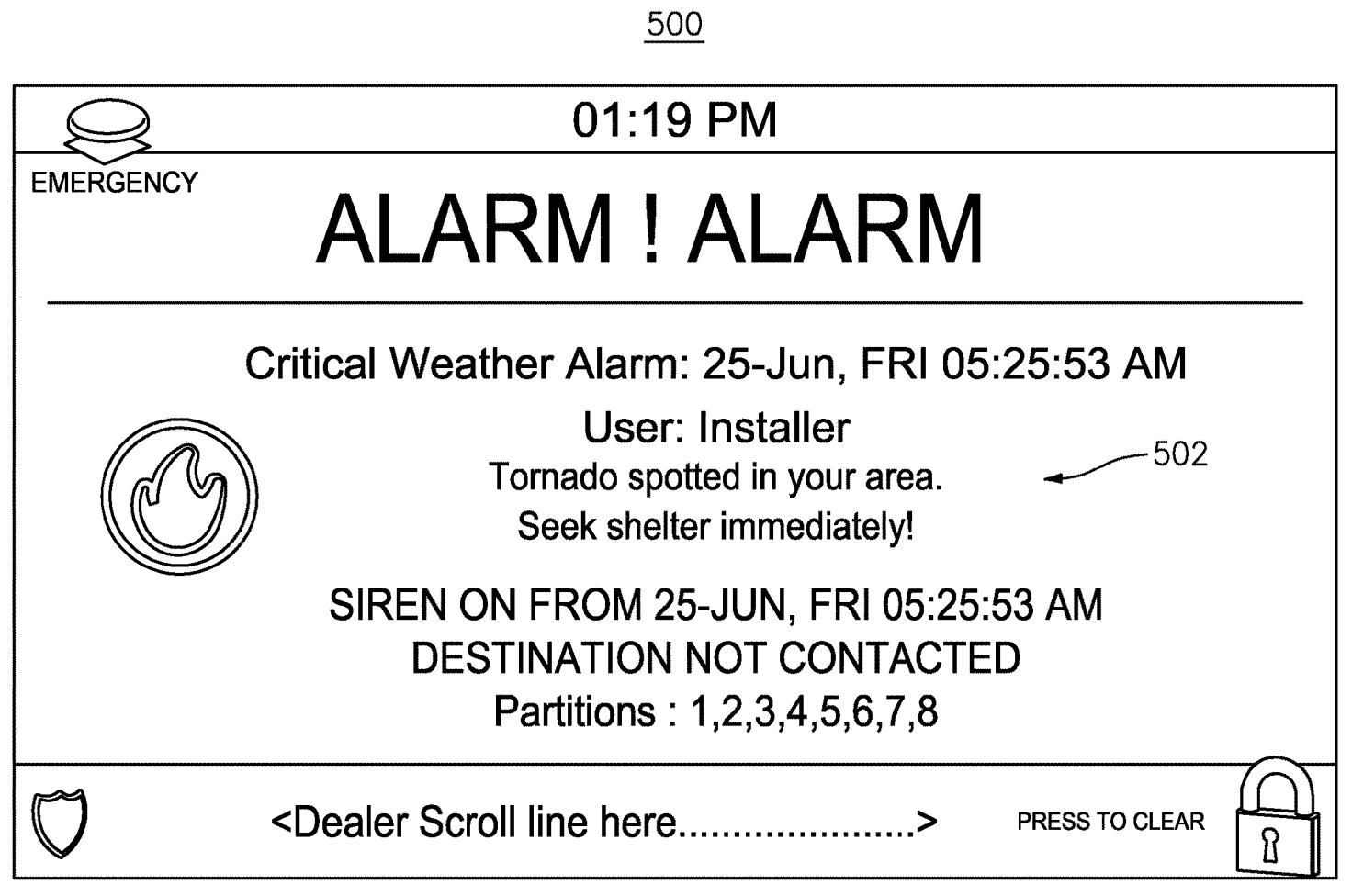

FIG. 5 illustrates an example of a remotely triggered alert 500 via a virtual sensor in accordance with one or more embodiments. In this example, the virtual sensor may be the virtual sensor 119 of FIG. 1, where a weather service is the remote data source 116 of FIG. 1 that provides remotely detected information resulting in the remotely triggered alert 500 to the security panel 102 of FIGS. 1-3. The virtual sensor input 118 of FIG. 1 may include metadata 502 to display on the user interface 216 of FIG. 2 as additional details associated with the alert. The metadata 502 can include location specific information, instructions, and/or other information.

Embodiments of the disclosure may be tied to one or more particular machines. For example, one or more devices, apparatuses, systems. Or architectures may be configured to interface with or respond to virtual sensors. Virtual sensors can be both locally and remotely installable, configurable, and removable.

As described herein, in some embodiments various functions or acts may take place at a given location and/or in connection with the operation of one or more apparatuses, systems, or devices. For example, in sonic embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer readable media, such as a transitory and/or non-transitory computer-readable medium. The instructions, when executed, may cause an entity (e.g., an apparatus or system) to perform one or more methodological acts as described heroin.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A security panel, comprising:
   a sensor subsystem configured to receive sensor input from a plurality of physical sensors directly interfaced to the sensor subsystem;
   a virtual sensor subsystem configured to receive a virtual sensor input from an enrolled virtual sensor source as a virtual sensor and provide the virtual sensor input to the sensor subsystem, wherein the enrolled virtual sensor source is independent from the plurality of physical sensors directly interfaced to the sensor subsystem; and
   a monitoring subsystem configured to provide an alert based on detection of an alert condition associated with at least one of the physical sensors and to provide the alert based on detection of a virtual alert condition associated with the virtual sensor, wherein the virtual sensor input further comprises metadata to display on a user interface as additional details associated with the alert.

2. The security panel of claim 1, wherein the plurality of physical sensors establish a security perimeter.

3. The security panel of claim 2, wherein the enrolled virtual sensor source is a third-party source for a physical sensor within the security perimeter that is not directly compatible with the sensor subsystem.

4. The security panel of claim 2, wherein the enrolled virtual sensor source is a remote data source external to the security perimeter and configured to provide a virtual sensor alert as the virtual sensor input to the virtual sensor subsystem through a virtual sensor application programming interface.

5. The security panel of claim 1, wherein a state of the virtual sensor is remotely settable as meeting the virtual alert condition.

6. The security panel of claim 1, wherein the virtual sensor is remotely installable, configurable, and removable.

7. A security system, comprising:
   a plurality of virtual sensors configured to provide virtual sensor input from a plurality of enrolled virtual sensor sources;
   a plurality of physical sensors configured to provide sensor input; and
   a security panel comprising:
      a sensor subsystem configured to receive the sensor input from the plurality of physical sensors directly interfaced to the sensor subsystem;
      a virtual sensor subsystem configured to receive the virtual sensor input and provide the virtual sensor input to the sensor subsystem, wherein the enrolled virtual sensor sources are independent from the plurality of physical sensors directly interfaced to the sensor subsystem; and
      a monitoring subsystem configured to provide an alert based on detection of an alert condition associated with at least one of the physical sensors and to provide the alert based on detection of a virtual alert condition associated with at least one of the virtual sensors, wherein the virtual sensor input further comprises metadata to display on a user interface as additional details associated with the alert.

8. The security system of claim 7, wherein the plurality of physical sensors establish a security perimeter.

9. The security system of claim 8, wherein at least one of the enrolled virtual sensor sources is a third-party source for a physical sensor within the security perimeter that is not directly compatible with the sensor subsystem.

10. The security system of claim 8, wherein at least one of the enrolled virtual sensor sources is a remote data source external to the security perimeter and configured to provide a virtual sensor alert as the virtual sensor input to the virtual sensor subsystem through a virtual sensor application programming interface.

11. The security system of claim 7, wherein a state of at least one of the virtual sensors is remotely settable as meeting the virtual alert condition.

12. The security system of claim 7, wherein at least one of the virtual sensors is remotely installable, configurable, and removable.

13. A method for virtual sensor management on a security panel, comprising:

receiving a request at the security panel to add a virtual sensor;

enrolling a virtual sensor source through a virtual sensor subsystem of the security panel, the enrolled virtual sensor source configured to provide a virtual sensor input of the virtual sensor, wherein the enrolled virtual sensor source is independent from a plurality of physical sensors directly interfaced to a sensor subsystem;

configuring the virtual sensor to establish a virtual alert condition;

initiating monitoring of the virtual sensor in addition to monitoring of the plurality of physical sensors through the sensor subsystem of the security panel that establishes a security perimeter;

receiving metadata in the virtual sensor input from the enrolled virtual sensor source;

outputting an alert based on detection of the virtual alert condition associated with the virtual sensor; and outputting additional details associated with the alert from the metadata to a user interface.

14. The method of claim 13, wherein the enrolled virtual sensor source is a third-party source for a physical sensor within the security perimeter that is not directly compatible with the sensor subsystem.

15. The method of claim 13, wherein the enrolled virtual sensor source is a remote data source external to the security perimeter and configured to provide a virtual sensor alert as the virtual sensor input to the virtual sensor subsystem through a virtual sensor application programming interface.

16. The method of claim 13, further comprising:
setting a state of the virtual sensor to meet the virtual alert condition based on a remotely issued command.

17. The method of claim 13, further comprising:
receiving a removal request at the security panel identifying the virtual sensor; and
remotely removing the virtual sensor based on the removal request received at the security panel.

* * * * *